United States Patent [19]

Schafer, Sr.

[11] 3,768,170

[45] Oct. 30, 1973

[54] APPARATUS FOR MEASURING PISTON POSITION

[76] Inventor: Arthur W. Schafer, Sr., 215 Branch St., Almont, Mich.

[22] Filed: June 4, 1971

[21] Appl. No.: 150,087

[52] U.S. Cl.......................... 33/181 AT, 33/DIG. 15
[51] Int. Cl. ............................................. G01b 5/14
[58] Field of Search ................. 33/180 AT, 181 AT, 33/DIG. 15

[56] References Cited
UNITED STATES PATENTS

| | | | |
|---|---|---|---|
| 1,485,429 | 3/1924 | Powell | 33/DIG. 15 |
| 1,683,710 | 9/1928 | Zitzmann | 33/DIG. 15 |

FOREIGN PATENTS OR APPLICATIONS

| | | | |
|---|---|---|---|
| 40,181 | 6/1932 | France | 33/DIG. 15 |
| 130,195 | 7/1919 | Great Britain | 33/DIG. 15 |

Primary Examiner—Louis R. Prince
Assistant Examiner—Charles E. Phillips
Attorney—Harness, Dickey & Pierce

[57] ABSTRACT

An apparatus, for measuring the axial position of a piston within a cylinder bore of an internal combustion engine with a spark plug opening aligned at a predetermined angle with respect to the axis of the cylinder bore, which has tubular member threadedly engaging the spark plug opening at one end with a gauge mounting extending therefrom at the other end for mounting a gauge so that a spindle for the gauge extends substantially parallel to or at a relatively small angle with respect to the cylinder bore axis. The tubular member is provided with an off-axis side opening adjacent with and in alignment with the spark plug opening through which the spindle extends into engagement with the piston.

22 Claims, 3 Drawing Figures

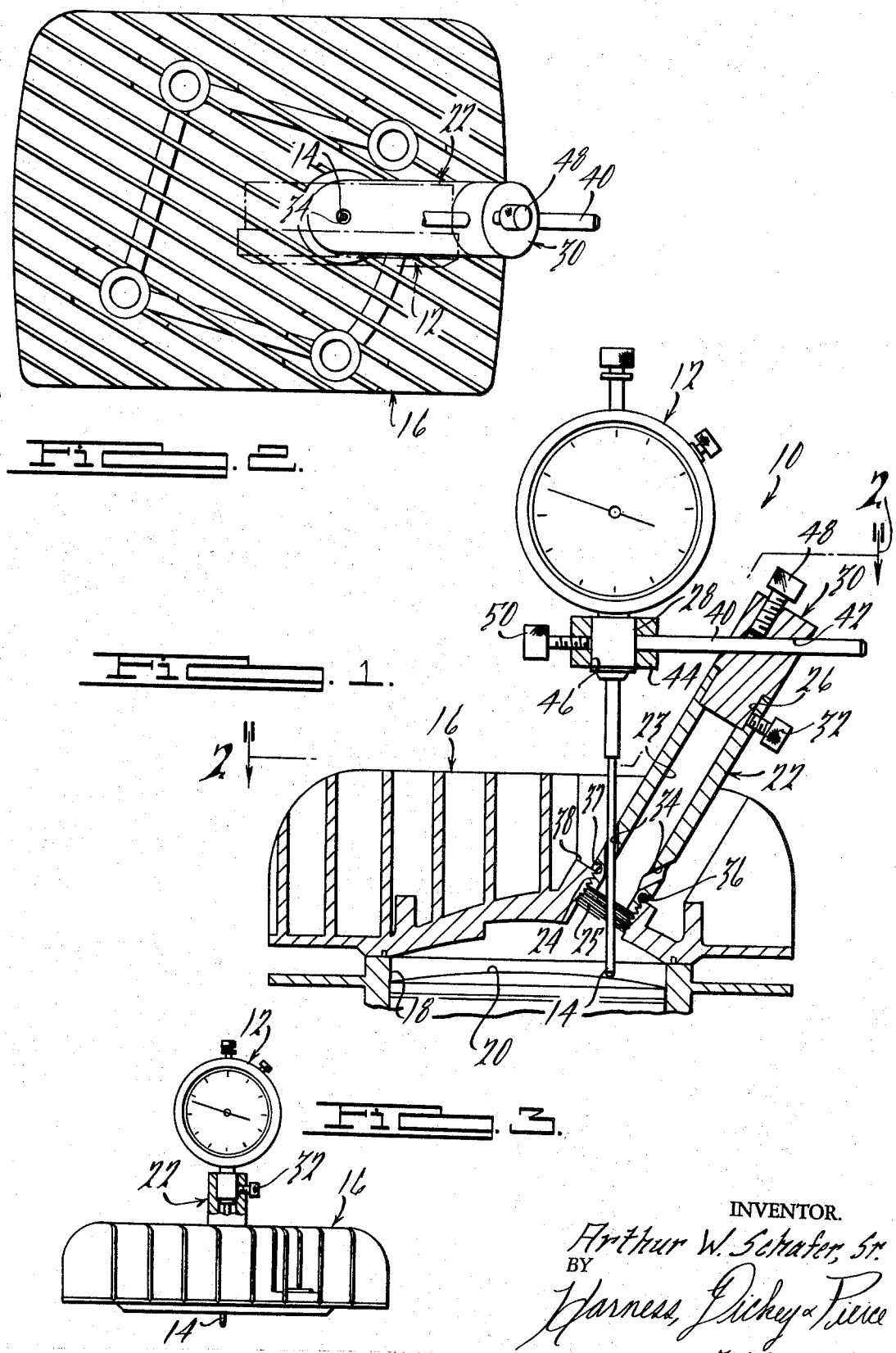

APPARATUS FOR MEASURING PISTON POSITION

BACKGROUND AND SUMMARY OF THE INVENTION

The present invention relates to devices for measuring the axial position of a piston in a cylinder bore of an internal combustion engine, two cycle or four cycle, for an automobile, snowmobile, motorcycle, etc. In one method of timing the ignition of an internal combustion engine, the axial position of a piston is measured to determine both the top dead center (TDC) position of the piston and positions prior to TDC. These piston position measurements are generally accomplished using a gauge, such as dial indicator gauge having a linearly movable spindle, which is mounted on one end of a tubular member having threads for engaging the threaded spark plug opening of the engine at its other end. The gauge is mounted with its spindle coaxially extending through the bore of the tubular member and the spark plug opening into engagement with the piston to be moved thereby. The small displacement engines with which these methods are practiced generally have spark plugs which are aligned substantially parallel with the axis of the cylinder bore. Those skilled in the art refer to these engines as having "90° spark plugs." It will be appreciated that a spindle coaxially disposed in a 90° spark plug opening will be aligned with piston movement so that piston movements are directed along the axis of the spindle with the development of a minimum amount of side forces on the spindle.

Recently, there has been an increased use of engines with "off-axis" spark plugs, for example, with spark plugs opening oriented at an angle of 30° – 45° with respect to the cylinder bore axis. With these engines, it will be appreciated that a conventional mount for an excursion gauge will orient the gauge spindle at an angle with respect to the movement of the piston (30° in the case of 30° spark plug engines), and consequently, the motion of the spindle is angularly related to the motion of the piston. Consequently, side forces are created which act on the gauge member to deflect it. Obviously these side forces are operationally detrimental with respect to both measurement accuracy and gauge longevity.

The present invention provides an apparatus for measuring piston position which is suitable for use with engines having 90° spark plugs and, through slight modification, which is also well suited for use with engines having off-axis spark plugs, including 30° – 45° spark plug engines. In an exemplary embodiment of an apparatus for measuring piston position according to this invention, a tubular member having means for mounting a dial gauge or the like on one end and an externally threaded portion at the other end, in the manner used for measuring piston position with engines having 90° spark plugs, is adapted for measuring off-axis spark plugs by the provision of at least one opening through the side of the tubular member near the externally threaded end. The tubular member is rotatable to align the side opening with the spark plug opening to provide an unobstructed linear path allowing passage of the spindle of a gauge through the side opening and the spark plug opening into engagement with the piston with the spindle aligned substantially in the direction of motion of the piston or at a reduced angle with respect to the direction of motion of the piston. Provision is made for mounting the gauge on an angle with respect to the tubular member by a stand-off mount secured to the tubular member. For example, a plug may be seated in the end of the tubular member in a manner like that used in mounting a gauge for measurement of piston position with 90° spark plug engines which carries a rod extending away from the tubular member having a gauge mount at its remote end which aligns the gauge with the opening in the side of the tubular member. The angle of the side opening in the tubular member and the angle of the gauge mounting rod with respect to the tubular member are complementary, i.e. total 90°, and are each selected in accordance with the offset of the spark plug. From the foregoing, and the following more detailed description of an exemplary apparatus according to this invention, it will be seen that a tubular gauge mounting member for engines having 90° spark plugs is readily adapted for use with off-axis spark plug engines and may be quickly reverted for use with 90° spark plug engines so that only one apparatus is needed for both types of engines.

BRIEF DESCRIPTION OF THE DRAWINGS

FIG. 1 is a side cross-sectional view of an exemplary apparatus according to the present invention for measuring piston position which is shown in combination with a cylinder head having a spark plug opening inclined at 30° with respect to the cylinder bore axis;

FIG. 2 is a top view of the apparatus of FIG. 1, taken partly in section generally along lines 2—2 of FIG. 1; and FIG. 3 is a side view, partly in section, of a portion of the piston position measuring apparatus of FIG. 1 being used in combination with a cylinder head having a 90° spark plug opening.

DETAILED DESCRIPTION OF THE PREFERRED EMBODIMENT

In FIG. 1, an exemplary embodiment 10 of a piston position measuring apparatus according to the present invention is illustrated. The apparatus 10 supports a dial indicator 12 which has a spindle 14 which extends through a cylinder head 16 into a cylinder bore 18 to engage the upper surface of a piston 20. The spindle 14 is linearly moveable along its own axis and is resiliently biased downwardly against the upper surface 20 of the piston such that follows the piston movement within the range of movement of the spindle 14. As will be appreciated by those skilled in the art, the gauge 12 may be a dial gauge which converts the linear excursions of the spindle 14 into rotational motions of a hand on a dial so that the linear position of the spindle 14 may be read on the dial.

The apparatus 10 includes an elongated tubular member 22 having an internal bore 23 and an externally threaded portion 24 at one end which is adapted to threadedly engage a spark plug opening 25 of the cylinder head 16 as illustrated in FIG. 1. The tubular member 22 further has an enlarged bore portion 26 which is adapted to receive a cylindrical mounting portion 28 of a gauge in one use, and an off-axis gauge mount 30 in another use. A locking screw 32 is provided which is threadedly engaged with a radial opening in the tubular member 22 at the enlarged bore portion 26 for engaging and retaining the cylindrical mounting portion 28 of the gauge 12 or the off-axis mounting member 30. The tubular member 22 has a pair of off-axis openings 34 in the wall thereof communicating with the internal bore 23 of the tubular member 22 which are of sufficient diameter to freely receive the spindle 14 of the gauge 12. Although a cylinder bore 34 is illustrated, any aperture means formed in the wall of the tubular member 22 may be used which provides an unobstructed linear path for the spindle 14 of the gauge 12 which intersects with the piston 20. An O-ring 36 is disposed intermediate a shoulder 37 on the tubular member 22 and a shoulder 38 on the cylinder head adjacent the spark plug opening. The O-ring 36 may be retained as illustrated by a thread relief on the tubular member 22 adjacent the shoulder 37. In one common construction of cylinder heads, two thread entry points are provided for the spark plug opening, i.e. the spark plug or tubular member 22 may be started at two rotational positions spaced 180° apart. To accomodate that construction, the two openings 34 spaced 180° apart have been provided. To further accomodate any misalignment of the openings 34 after the shoulder 37 of the tubular member 22 has initially seated, the resilient O-ring 36 has been provided which may be resiliently compressed so as to allow the tubular member 22 to be rotated to vertically align one of the openings 34 with the spark plug opening 25. It can be seen that several threads remain when the shoulder 36 initially engages the O-ring 34 so as to allow proper vertical alignment of one of the openings 34. The compressive engagement of the shoulder 37 with the O-ring 36 provides a relatively stable relationship between the tubular member 22 and the cylinder head 16 to contribute to the accuracy of the measuring operation.

The spindle 14 of the gauge 12 is mounted in alignment with the direction of motion of the piston 20 by the combination of a rod 40 which extends through a bore 42 in the mounting member 30 and a collar 44 having an internal bore 46 which received the cylindrical mounting portion 28 of the gauge 12. To facilitate alignment of the components to provide an unobstructed linear path for the spindle, the mounting member 30 is rotatably adjustable within the enlarged bore portion 26 and is securable in position by a screw 32 while the rod 40 is rotationally and slidably adjustable within the bore 42 of the member 30 and is securable in position by a knurled screw 48. The screw 48 may be axially aligned with respect to the mounting member 30 as shown or may be transversely aligned. The cylindrical portion 28 of the gauge 12 is slidable and rotationally adjustable in the bore 46 and may be secured in position by a knurled screw 50. Of course, the knurled screws 48 and 50 may be replaced by thumb screws, and for that matter, by any suitable securing means. Although the members may be manufactured in fixed position, the adjustable feature allows corrections for any misalignments occurring through machining tolerances and abuse and allows easy disassembly of the apparatus for cleaning and storage.

To accommodate a standard spark plug opening which is inclined at an angle of 30° with respect to the cylinder bore axis the rod 40 is mounted at an angle of 60° with respect to the axis of the tubular member 22, the openings 34 are inclined at a complementary angle of 30° with respect to the axis of the tubular member 22, and the bore 46 of the collar 44 is oriented at 90° with respect to the rod 40.

It will be appreciated that for non-standard spark plug openings and other off-axis angulations of spark plugs, appropriate adjustments in the angular relationships between the rod 40 and the openings 34 with respect to the tubular member 22 are desirable. In the case of spark plugs opening that are angled from the cylinder bore axis 18 by substantially more than 30° or spark plug opening of the extra deep type, the lower and upper bore portions of the spark plug openings converge on the vertical axis and may prevent the alignment of an opening 34 which allows insertion of a gauge spindle 14 along an axis which is parallel to the cylinder bore axis 18. Nonetheless, an apparatus according to the present invention may be used to minimize the angular relationship between the gauge spindle and the motion of the piston. In one example of a device modified for non-standard spark plugs, an inclination of the openings 34 of 25° 30' with respect to the axis of tubular mounting 22 has been found to be particularly suitable compromise for both 30° extra deep spark plug openings and 40° to 45° spark plug openings. The angle between the rod in that example was the complementary angle of 64° 30'. In an exemplary embodiment with a pair of openings 43 at 25° 30' with respect to the axis to the tubular member 22, a spacing of approximately 0.5 inches from the shoulder 37 to the center line of the opening 34 at the radially outward wall of the tubular member 22 an opening 34 diameter of 0.24 inches, and a distance of approximately 0.37 inches from the shoulder 37 to the end of the tubular member 22 was used with a tubular member 22 having an inside diameter of approximately 0.374 inches and an outside diameter of 0.75 inches. In another example, the rod 40 was mounted at an angle of 65° with respect to the tube 22, and openings 34 were provided which were inclined at complementary angles of 25°. With regard to the latter two embodiments, perfect alignment with the cylinder bore axis is not attained. By way of illustration, the spindle 14 of the gauge 12 may be aligned at approximately 5° with respect to the cylinder bore axis. It will be further appreciated that the angulation is in the direction of the axis of the spark plug opening, and accordingly, the apparatus of the latter two embodiments appears like that shown in the drawings except for the differences in angulation of the rod 40 and the openings 34 with respect to the tubular member as well as the difference in angulation of the spindle 14 with respect to the cylinder bore axis. It can be seen that the spindle angulation with respect to the cylinder bore axis when using a gauge mounting device according to this invention is substantially less than a 30° to 45° angulation which would be experienced using a prior art gauge mounting apparatus. Accordingly, the side forces on the spindle 14 are decreased thereby reducing the deflection of the spindle 14 to increase measurement accuracy.

The mounting member 30 may be removed from the enlarged bore portion 26 and the gauge 12 may be positioned within the enlarged bore portion 26 to accomodate engines having conventional 90° spark plugs, as illustrated in FIG. 3.

It will be appreciated that the apparatus of this invention may be used with 10, 14 and 18 MM spark plugs.

In view of the above description of an exemplary piston position measuring apparatus according to this invention, it can be seen that piston position is conveniently measured in both 90° spark plug engines and off-axis spark plug engines. Moreover, the apparatus disclosed herein mounts a measuring gauge with its spindle extending in substantial alignment with the direction of movement of the piston. Therefore detrimental spindle side forces and spindle deflections are avoided so that measurements may be accurately taken and the operating stresses on the gauge are minimized.

While it will be apparent that the teachings herein are well calculated to each one skilled in the art the method of making preferred embodiment of this invention, it will be appreciated that the invention is susceptible to modification, variation and change without departing from the proper scope of meaning of the subjoined claims.

What is claimed is:

1. For an internal combustion engine having a piston movable within a cylinder bore along the axis of the bore and a spark plug opening communicating with said cylinder bore being aligned at a predetermined angle with respect to said cylinder bore axis, an apparatus for measuring the axial position of said piston with said cylinder bore comprising:

a tubular member for engaging said spark plug opening having a through bore for mounting a gauge having a spindle member with the spindle member extending through said bore for engaging said piston to be moved thereby whereby engines having spark plug openings aligned parallel to said cylinder bore axis may be accommodated, said tubular member further including aperture means therein adjacent said spark plug opening, said tubular member being adapted for positioning said aperture means with respect to said spark plug opening for providing an unobstructed linear path through said aperture means and said spark plug opening to said piston, said unobstructed linear path being at a substantially lesser angle with respect to said cylinder bore axis than the predetermined angle of said spark plug opening; and mounting means carried by said tubular member for alternatively mounting said gauge with said spindle member extending through said aperture means and said spark plug opening along said unobstructed linear path for engaging said piston to be moved thereby.

2. An apparatus according to claim 1 wherein said tubular member bore is aligned with said spark plug opening, said tubular member having a side wall and said side wall having said aperture means, said tubular member has external threads at one end for engaging corresponding threads in said spark plug opening, and wherein said mounting means is secured at the opposite end of said tubular member and extends from said tubular member.

3. An apparatus according to claim 1 wherein said mounting means includes a first member having a cylindrical portion residing in said bore and being secured to said opposite end of said tubular member.

4. An apparatus according to claim 3 wherein said mounting means includes a second member extending with respect to said spark plug opening at an angle of approximately 60°–65° thereto.

5. An apparatus according to claim 1 wherein said tubular member and said mounting means are dimensioned and arranged to provide said linear path for said spindle member through spark plug openings which are aligned up to and including 30° with respect to said cylinder bore axis.

6. An apparatus according to claim 1 wherein said tubular member and said mounting means are dimensioned and arranged to provide said linear path for said spindle member through spark plug openings which are aligned up to and including 45° with respect to said cylinder bore axis.

7. An apparatus according to claim 1 wherein said tubular member and said mounting means are dimensioned and arranged to provide said linear path for said spindle member through spark plug openings which are aligned substantially 30° with respect to said cylinder bore axis, and wherein said unobstructed linear path is substantially aligned with said cylinder bore axis.

8. An apparatus according to claim 7 wherein said mounting means includes a first member extending with respect to said spark plug opening at an angle of substantially 60° thereto such that said first member extends substantially perpendicularly with respect to said cylinder bore axis.

9. An apparatus according to claim 1 wherein said tubular member is aligned with said spark plug opening and has an externally threaded portion at one end for engaging corresponding threads in said spark plug opening, said mounting means including an extending member extending from said mounting means, said extending member carrying mounting means including a bore for mounting said gauge at an end remote from said tubular member.

10. An apparatus according to claim 9 including means for adjustably positioning said extending member to adjustably position said gauge with respect to said cylinder bore axis.

11. An apparatus according to claim 10 wherein said means for adjustably positioning said extending member provides rotational positioning of said gauge with respect to said cylinder bore axis.

12. An apparatus according to claim 10 wherein said means for adjustably positioning said extending member provides linear positioning of said gauge with respect to said cylinder bore axis.

13. An apparatus according to claim 12 wherein said second aperture means is angularly spaced substantially 180° from said first aperture means.

14. An apparatus according to claim 1 wherein said tubular member includes a second aperture means in said body being angularly spaced from said first aperture means with respect to the axis of said spark plug opening.

15. An apparatus according to claim 1 wherein said tubular member includes O-ring means adapted to resiliently engage said engine at said spark plug opening for adjustable rotational positioning of said tubular member with respect to the axis of said spark plug opening.

16. The apparatus according to claim 15 wherein said tubular member includes a second aperture means in said body being angularly spaced from said first aperture means with respect to the axis of said spark plug opening, said spark plug opening having two thread engaging points, and the resiliency of said O-ring being established so as to permit the alignment of one of said aperture means with said spark plug opening to provide an unobstructed linear path with engagement at a first engaging point and to permit the alignment of the other of said aperture means with said spark plug opening to provide an unobstructed linear path with engagement at a second engaging point.

17. An apparatus according to claim 1 wherein said aperture means is a bore in said tubular member.

18. An apparatus according to claim 17 wherein said tubular member extends generally along the axis of said spark plug opening, and said bore is upwardly and outwardly inclined with respect to said axis at an angle of approximately 30°.

19. An apparatus according to claim 17 wherein said tubular member extends generally along the axis of said spark plug opening and wherein said bore is upwardly and outwardly inclined with respect to said axis at an angle of approximately 25°.

20. For an internal combustion engine having a piston movable within a cylinder bore along the axis of the bore and a spark plug opening in a cylinder head communicating with said cylinder bore being aligned along an axis which is at a predetermined angle with respect to said cylinder bore axis, an apparatus for measuring the axial position of said piston within said cylinder bore comprising:
   a first member having one end mounted in said spark plug opening and an aperture means therethrough at an angle to the axis of said spark plug opening, said first member being adapted for positioning said aperture means with respect to said spark plug opening for providing an unobstructed linear path through said aperture means and said spark plug opening to said piston;
   a second member extending laterally from said first member including mounting means for mounting a gauge having a spindle member with said spindle member extending through said aperture means and said spark plug opening along said linear path being at a substantially lesser angle with respect to said cylinder bore axis than the predetermined angle of said spark plug opening axis for engaging said piston to be moved thereby; and
   means for adjusting the lateral extension of said second member relative to said first member to adjustably position said spindle member is said aperture means.

21. For an internal combustion engine having a piston movable within a cylinder bore along the axis of the bore and a spark plug opening communicating with said cylinder bore being aligned at a predetermined angle with respect to said cylinder bore axis, an apparatus for measuring the axial position of said piston with said cylinder bore comprising:
   a tubular member engaging said spark plug opening having a body with a side wall and an internal bore aligned with said spark plug opening and first and second aperture means in said side wall being angularly spaced each from the other with respect to the axis of said spark plug opening, said body having external threads with two thread engaging points at one end for initially engaging corresponding threads in said spark plug opening at two correlative rotational positions of said tubular member, said tubular member being adapted for positioning said first and second aperture means at respective times relative to said spark plug opening for providing an unobstructed linear path through said aperture and said spark plug opening to said piston, said unobstructed linear path being at a substantially lesser angle with respect to said cylinder bore axis than the predetermined angle of said spark plug opening;
   mounting means secured at the end opposite said one end of said tubular member and extending from said tubular member for mounting a gauge having a spindle member with said spindle member extending through said first and second aperture means at respective times and said spark plug opening along said unobstructed linear path for engaging said piston to be moved thereby; and
   O-ring means adapted to resiliently engage said engine at said spark plug opening for adjustable rotational positioning of said tubular member with respect to the axis of said spark plug opening, the resiliency of said O-ring means being established so as to permit the alignment of one of said first and second aperture means with said spark plug opening to provide said unobstructed linear path with initial engagement at one rotational position of said tubular member correlative to one of said thread engaging points and to permit the alignment of the other of said first and second aperture means with said spark plug opening to provide said unobstructed linear path with initial engagement at the other rotational position of said tubular member correlative to the other of said thread engaging points.

22. For an internal combustion engine having a piston movable within a cylinder bore along the axis of the bore and a spark plug opening communicating with said cylinder bore being aligned at a predetermined angle with respect to said cylinder bore axis, an apparatus for measuring the axial position of said piston with said cylinder bore comprising:
   a member engaging said spark plug opening having a body with first and second aperture means in said side wall of said body means being angularly spaced each from the other with respect to the axis of said spark plug opening, said body having external threads with two thread engaging points at one end for initially engaging corresponding threads in said spark plug opening at two correlative rotational positions of said member engaging said spark plug opening, said member engaging said spark plug opening being adapted for positioning said first and second aperture means at respective times relative to said spark plug opening for providing an unobstructed linear path through said aperture and said spark plug opening to said piston, said unobstructed linear path being at a substantially lesser angle with respect to said cylinder bore axis than the predetermined angle of said spark plug opening;
   mounting means carried at the end opposite said one end of said member engaging said spark plug opening and extending from said member engaging said spark plug opening for mounting a gauge having a spindle member with said spindle member extending through said first and second aperture means at said respective times and said spark plug opening along said unobstructed linear path for engaging said piston to be moved thereby; and
   resilient means adapted to resiliently engage said engine at said spark plug opening for adjustable rotational positioning of said member engaging said spark plug opening with respect to the axis of said spark plug opening, the resiliency of said resilient means being established so as to permit the alignment of one of said first and second aperture means with said spark plug opening to provide said unobstructed linear path with initial engagement at one rotational position of said member engaging said spark plug opening correlative to one of said thread engaging points and to permit the alignment of the other of said first and second aperture means with said spark plug opening to provide said unobstructed linear path with initial engagement at the other rotational position of said member engaging said spark plug opening correlative to the other of said thread engaging points.

* * * * *